Aug. 24, 1948.　　　E. FRISCH　　　2,447,644
REGULATING SYSTEM
Filed May 13, 1947
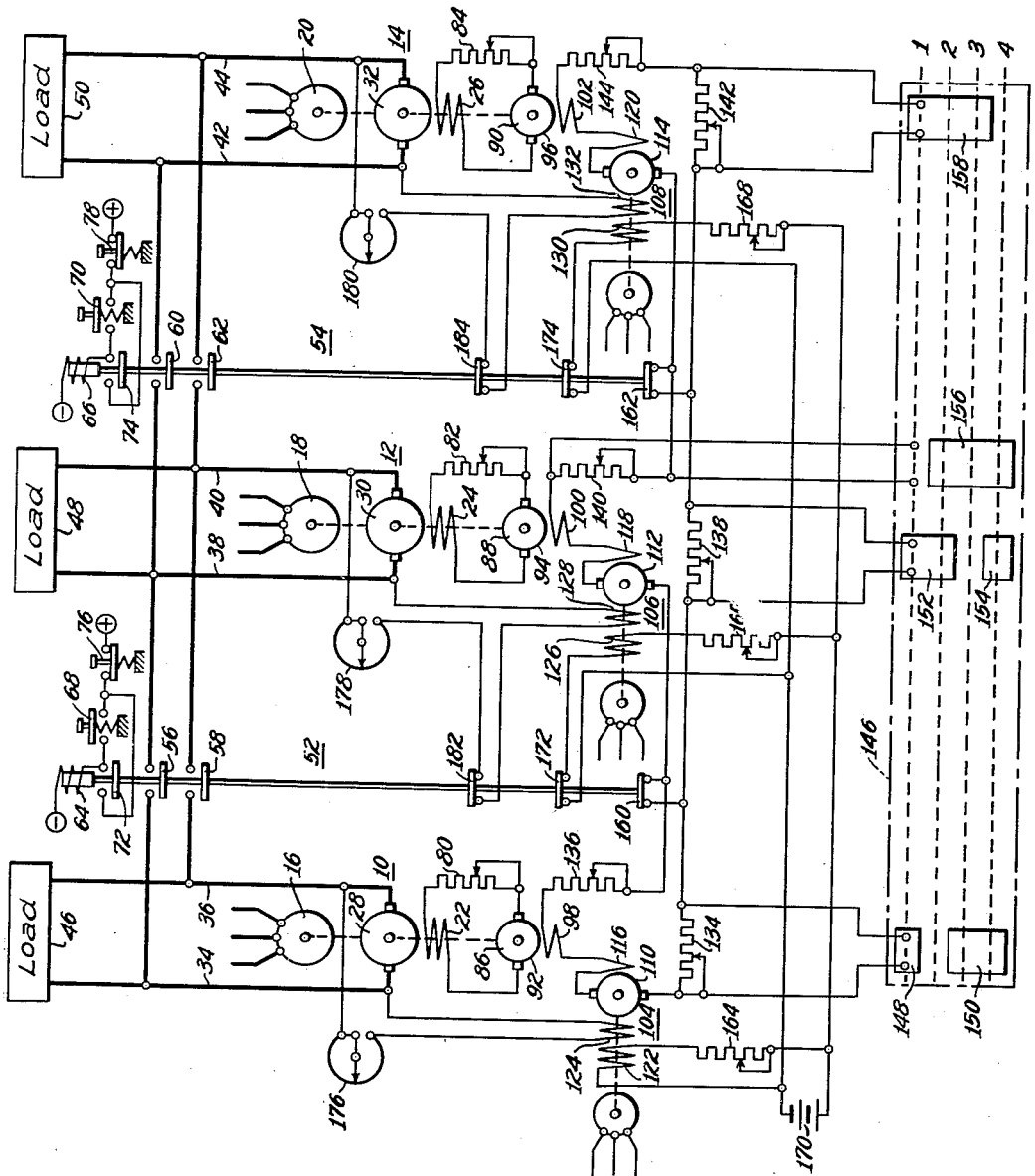
WITNESSES:
Robert C. Baird
W. C. Groome
INVENTOR
Erling Frisch.
BY
James N. Ely
ATTORNEY Patented Aug. 24, 1948

2,447,644

UNITED STATES PATENT OFFICE 2,447,644

REGULATING SYSTEM

Erling Frisch, Pittsburgh, Pa., assignor to Westinghouse Electric Corporation, East Pittsburgh, Pa., a corporation of Pennsylvania Application May 13, 1947, Serial No. 747,782

5 Claims. (Cl. 171—119)

This invention relates to regulating systems.

In many industrial applications where power for motors or other loads is supplied from two or more generators in separate circuits, independent regulating systems are provided for regulating the generators between zero and a rated value, the regulators being controlled from a common reference voltage source. Recently regulating generators have been employed as the independent regulators, each regulating generator being provided with a series field winding and two opposed control field windings, one of which is connected to be energized from the common reference source to provide a pattern, the other being connected to be responsive to an electrical characteristic of the generator to be regulated.

Under some operating conditions, it is desired to connect the generators in parallel to supply the load. Where the regulating generators have been utilized to regulate the generators, it has heretofore been impractical to connect the generators for parallel operation as a complicated transfer switching arrangement was required while at the same time the regulating generators had to be designed with sufficient capacity to supply the excitation requirements of all of the generators.

An object of this invention is to provide a regulating system for generators disposed for operation in parallel.

Another object of this invention is to provide in a system having a plurality of generators, the excitation of each of which is controlled by a regulating generator, for connecting the generators in parallel circuit relation for supplying a common load while simultaneously therewith connecting the regulating generators in series circuit and rendering all of the regulating generators responsive to the control of only one of the regulating generators as a master unit.

Other objects of this invention will become apparent from the following description when taken in conjunction with the accompanying drawing, the single figure of which is a diagrammatic view of circuits and apparatus embodying the teachings of this invention.

Referring to the drawing, this invention is illustrated by reference to three generators 10, 12 and 14 disposed to be driven by independent motors 16, 18 and 20, respectively. The generators 10, 12 and 14 are of usual construction having field windings 22, 24, and 26, respectively, and armature windings 28, 30 and 32, respectively, which are connected by load conductors 34—36, 38—40 and 42—44, respectively, to supply loads indicated at 46, 48 and 50, respectively.

As illustrated, contactors 52 and 54 are disposed to be energized to actuate their contact members 56—58 and 60—62, respectively, to circuit closing positions to connect generators 10—12 and 12—14, respectively, in parallel circuit relation for supplying the load. Thus the contactors 52 and 54 are provided with energizing windings 64 and 66, respectively, disposed to be energized when the switches 68 and 70, respectively, are manually operated to circuit-closing positions, the contact members 72 and 74, respectively, establishing holding circuits which are disposed to be interrupted by manual operation of switches 76 and 78, respectively.

In order to energize the field windings 22, 24 and 26 of generators 10, 12 and 14, respectively, the field windings are connected through adjustable field rheostats 80, 82 and 84, respectively, across armature windings 86, 88 and 90, respectively, of main exciters 92, 94 and 96, respectively, which are driven by motors 16, 18 and 20, respectively. The main exciters 92, 94 and 96 are provided with field windings 98, 100 and 102 respectively which are connected to be energized by regulating exciters or generators 104, 106 and 108, respectively.

The regulating exciters 104, 106 and 108 are of the self-excited "series tuned" type being provided with armature windings 110, 112 and 114, respectively, and a plurality of field windings such as the series field windings 116, 118 and 120, respectively, and a pair of differential control field windings 122—124, 126—128 and 130—132, respectively. As illustrated, adjustable resistors 134—136, 138—140 and 142—144 are disposed to be selectively connected in circuit relation with the series field windings 116, 118 and 120, respectively, for tuning the exciters 104, 106 and 108, respectively, depending upon the operation of contactors 52 and 54 and a drum controller 146 for connecting the generators 10, 12 and 14 for individual operation or for selective parallel operation or for operation with all of the generators connected in parallel.

Thus the drum controller 146 is provided with segments 148—150, 152—154, 156 and 158 for controlling the connecting of adjustable resistors 134, 138, 140 and 142, respectively, as the controller 146 is operated through the four positions illustrated. The contactors 52 and 54 are provided with contact members 160 and 162, respectively, which are normally maintained in circuit-closing positions to provide closed circuits for the series field windings 116, 118 and 120 when the contactors 52 and 54 are deenergized and the generators 10, 12 and 14 are operated to supply individual loads but are disposed for movement to open circuit position when contactors 52 and 54 are energized whereby the series field windings 116, 118 and 120 will be connected in series circuit relation with one another.

The control field windings 122, 126 and 130 are disposed to be connected through adjustable rheostats 164, 166 and 168, respectively, to a constant source of supply, such as the battery 170 whereby field windings 122, 126 and 130 provide pattern control fields for the regulating exciters or generators 104, 106, and 108, respectively. The connections of the field windings 126 and 130 with the constant source 170 are controlled by contact members 172 and 174, respectively, of contactors 52 and 54, respectively, so that when the contactors are actuated to selectively connect generators 10, 12 and 14 for operation in parallel circuit relation, the field windings 126 and 130, respectively, are selectively disconnected from the source of supply 170.

The other control field windings 124, 128 and 132 of the regulating exciters 104, 106 and 108, respectively, are normally connected through adjustable rheostats 176, 178 and 180, respectively, to be energized in accordance with the terminal voltage of generators 10, 12 and 14, respectively, for cooperating with control field windings 122, 126 and 130, respectively, to control the excitation of the "tuned" exciters 104, 106 and 108, respectively. As illustrated, the contactors 52 and 54 are also provided with contact members 182 and 184, respectively, which are also disposed to be actuated to open circuit positions when the windings 64 and 66, respectively, of the contactors are energized. When thus actuated, the contact members 182 and 184 interrupt the energizing circuits for control field windings 128 and 132, respectively, so that the control field windings 126-128 and 130-132 of exciters 106 and 108, respectively, are deenergized when contactors 52 and 54, respectively, are energized.

In operation, assuming that the generators 10, 12 and 14 are disposed to be driven by their motors 16, 18 and 20, respectively, for supplying their individual loads 46, 48 and 50, respectively, then the contactors 52 and 54 are maintained deenergized and the drum controller 146 is in position 1 as shown. In such position, the drum controller 146 effectively shunts resistors 134, 138 and 142 and the contact members 160 and 162 of contactors 52 and 54, respectively, function to connect the regulating exciters or generators 104, 106 and 108 for individual operation. The control of the regulating exciters 104, 106 and 108, therefore, is effected by controlling the energization of their control field windings 122-124, 126-128 and 130-132, respectively.

With the control field winding 122 of the regulating exciter 104 connected to the constant source of supply 170, the energization of the control field winding 124 is adjusted by means of the rheostat 176 so that for any given voltage across conductors 34 and 36, the energization of windings 122 and 124 are in a balanced condition. This is also true for the regulating exciters 106 and 108 and as the operation of the regulating systems for each of the generators 10, 12 and 14 when operated individually is similar to that for generator 10, only the description of the operation of the regulating system for the individual operation of generator 10 will be described.

With the adjustments made in the field resistance of the regulating generator 104 as referred to hereinbefore, if the voltage across conductors 34 and 36 should decrease from the voltage which is to be maintained then the energization of the control field windings 122 and 124 of the regulating exciter 104 becomes unbalanced to effect an action on the regulating exciter 104 in a direction to aid the effect of the series field winding 116 to increase the output therefrom and effect an increase in the energization of the field winding 98 of the main exciter 92. As the excitation of the main exciter 92 is thus increased, the energization of the field winding 22 of the generator 10 is also increased with the result that the voltage across the conductors 34 and 36 is increased toward the value which is to be maintained.

On the other hand, if the change in voltage across the conductors 34 and 36 is an increase, then the energization of control field winding 124 predominates over that of control field winding 122 to create an action which opposes the effect of the series field winding 116 to decrease the output of the regulating exciter 104. As the excitation of the regulating exciter 104 is thus decreased, the energization of the field winding 98 of the main exciter 92 is also decreased, with the result that the excitation of the generator 10 is also decreased to effect a reduction in the voltage across conductors 34 and 36 toward the value which is to be maintained.

If instead of the individual operation of the generators 10, 12 and 14 referred to hereinbefore, it is desired to connect certain of the generators for parallel operation, as for example generators 10 and 12, then the switch 68 is depressed to a contact-making position to close the circuit through the energizing winding 64 of contactor 52 to effect the operation of the contactor 52 to the energized position where its contact member 72 establishes a holding circuit for the energizing winding 64. In such position, the contact members 56 and 58 of the contactor 52 are in circuit closing positions to connect the generators 10 and 12 in parallel circuit relation and the contact members 160, 172 and 182 of contactor 52 are in open circuit positions. In this position, the contact members 172 and 182 interrupt the energizing circuits for the control field windings 126 and 128, respectively, of the regulating exciter 106 and the contact member 160 interrupts its bridging circuit whereby the armature windings 110 and 112 and the field windings 116 and 118, respectively, of the regulating exciters 104 and 106, respectively, are connected in series circuit relation.

At the same time that the contactor 52 is actuated to its energized position, the drum controller 146 is also manually operated from position 1 to position 2 to actuate the segment 148 to a position where it interrupts the shunting circuit about the resistor 134 and segment 156 effects a shunting circuit about the resistor 140. As will be appreciated, the regulating exciters 104, 106 and 108 are substantially identical as to their construction and electrical characteristics so that theoretically when once tuned as by adjusting their field resistances 136, 140 and 144, respectively, such regulating exciters should stay tuned regardless of whether they are operated individually or connected in series circuit relation. In practice, however, it is found that this is not the case where two or more of the regulating resistors are connected in series circuit relation and for this reason, it is desired to provide for automatically adjusting the field resistance in a step operation instead of having to manually adjust the individual field resistances 136, 140 and 144 each time the regulating exciters are connected for series circuit operation or disconnected for individual operation. Therefore, the resistance 134, which is connected in series circuit with the armature windings and series field windings of the regulating exciters 104 and 106 by movement of the drum controller 146 to position 2, effectively takes the place of the field resistance 140 which is shunted by the segment 156, to maintain the series connected field windings and armature windings in a tuned condition whereby the resistance of the self-excited field winding circuits of the series connected regulating generators 104 and 106 is of such a value that the field resistance line of the regulating exciter 104 coincides with the straight-line portion of the saturation curve thereof.

With the contactor 52 and the drum controller 146 in the positions just described, the operation of the regulating exciter 106 coincides with the operation of the regulating exciter 104, being controlled by the energization of the control field windings 122 and 124 of the regulating exciter 104. Thus with the generators 10 and 12 connected in parallel circuit relation by the contact members 56 and 58 of the contactor 52, as the voltage across conductors 34 and 36 decreases from the value which is to be maintained, the energization of the control field winding 124 decreases with respect to the energization of the control field winding 122, with the result that an action is effected which cooperates with the action of the series field winding 116 to increase the output of the regulating exciter 104. Since the armature windings 112 and series field windings 118 of the regulating exciter 106 are connected in series circuit relation with the armature windings 110 and series field windings 116 of the regulating exciter 104, the same current flows through the armature windings and series field windings of the respective regulating exciters so that as the output of the regulating exciter 104 is increased, the output of the regulating exciter 106 is also increased the same amount. Thus the energization of the field windings 98 and 100 of the main exciters 92 and 94, respectively, is simultaneously increased with the result that the excitation of the parallel connected generators 10 and 12 is also simultaneously increased to effect an increase in the voltage across the conductors 34 and 36.

Likewise, if the voltage across the conductors 34 and 36 should increase above the predetermined value which is to be maintained, the control field windings 122 and 124 cooperate due to the unbalanced condition thereof to effect a simultaneous action on the regulating exciters 104 and 106 to decrease the output therefrom and thereby simultaneously decrease the energization of the field windings 98 and 100 of the main exciters 92 and 94, respectively. The decrease in the excitation of the main exciters 92 and 94 effects a simultaneous decrease in the energization of the field windings 22 and 24 of the generators 10 and 12, respectively, to thereby decrease the outputs therefrom so that the voltage across conductors 34 and 36 is returned to the predetermined value which is to be maintained.

If instead of connecting generators 10 and 12 for parallel operation, it is desired to connect generators 12 and 14 for parallel operation, then the switch 76 is depressed to interrupt the energizing circuit for the winding 64 of contactor 52 whereby the contact members 160, 172 and 182 are returned to their circuit closing positions and contact members 56, 58 and 72 are returned to their circuit opening positions and switch 70 is manually actuated to a circuit closing position to energize the winding 66 of the contactor 54. When the contactor 54 is thus energized, it is actuated to a position where contact member 74 establishes a holding circuit for the energizing winding 66 and contact members 60 and 62 connect the output of the generators 12 and 14 in parallel circuit relation. At the same time, contact members 162, 174 and 184 of contactor 54 are actuated to circuit opening positions where the armature members 112 and 114 and the series field windings 118 and 120 of the regulating exciters 106 and 108, respectively, are connected in series circuit relation and the energizing circuits for the control field windings 130 and 132 of the regulating exciter 108 are interrupted. At the same time, the drum controller 146 is moved from position 2 to position 3 wherein the segment 150 shunts the resistor 134, segment 152 is moved to a position to interrupt the shunting circuit of resistor 138, and segments 156 and 158 maintain the shunting circuits about the resistors 140 and 142, respectively.

The parallel operation of generators 12 and 14 is similar to that of the parallel operation of generators 10 and 12 previously described, except that in this case, the operation is controlled by the regulating exciter 106 as the master exciter for controlling the simultaneous operation of the regulating exciters 106 and 108. As in the previous case, in order to make adjustments in the field resistance of the series connected series field windings, the resistor 140 is shunted and the resistor 138 is connected in series circuit with the series field windings to adjust the field resistance so as to insure that the field resistance line of the regulating exciter 106 coincides with the straight line portion of the saturation curve thereof.

Thus as the voltage across conductors 38 and 40 decreases from the predetermined value which is to be maintained, the opposed field windings 126 and 128 become unbalanced and create an action which aids the action of the series field windings 118 to increase the output of the regulating exciter 106, such action also increasing the output of the regulating exciter 108 as the same current passes through series field windings 118 and 120, to thereby simultaneously effect an increase in the energization of the field windings 100 and 102 of the main exciters 94 and 96, respectively. The increase in the excitation of the main exciters 94 and 96 effects a simultaneous increase in the excitation of the parallel connected generators 12 and 14 to return the voltage across conductors 38 and 40 to the predetermined value which is to be maintained.

Likewise, if the change in voltage across conductors 38 and 40 is an increase, then such increase in the energization of the control field winding 128 predominates over the energization of control field winding 126 to effect a simultaneous decrease in the output of regulating exciters 106 and 108 to simultaneously decrease the energization of the field windings 100 and 102 of the main exciters 94 and 96, respectively. As the excitation of the main exciters 94 and 96 is thus decreased, the energization of field windings 24 and 26 of the generators 12 and 14, respectively, is decreased whereby the output of the generators 12 and 14 is decreased to effect a return of the voltage across conductors 38 and 40 to the predetermined value which is to be maintained.

If instead of the parallel operation of only two of the generators as described hereinbefore, it is desired to operate all three of the generators 10, 12 and 14 in parallel, then the windings 64 and 66 of the contactors 52 and 54 are energized to operate the conductors to their energized positions as described and the drum controller 146 is manually operated from position 3 to position 4. With the contactors 52 and 54 in their energized positions, then the energizing circuits for the control field windings 126—128, and 130—132 of the regulating exciters 106 and 108, respectively, are interrupted and the armature members and series field windings of the regulating exciters 104, 106 and 108 are connected in series circuit relation. With the drum controller 146 in position 4, the segment 150 maintains the shunting circuit about the resistor 134, segment 154 shunts the resistor 138, segment 156 maintains the shunting circuit about the resistor 140 and segment 158 in the open circuit position to interrupt the shunting circuit about the resistor 142. In this instance, the resistor 142 is employed for adjusting or recalibrating the field resistance of the series connected field winding of the regulating exciters instead of the resistors 134 or 138.

The operation of the regulating circuit for maintaining parallel operation of the generators 10, 12 and 14 is similar to that described hereinbefore with respect to the regulating circuits for the parallel operation of any two of the generators. In this instance, the regulating exciter 104 is maintained as the master for controlling the operation of all three regulating exciters, such control depending upon the energization of the opposed control field windings 122 and 124 of the regulating exciter 104. Thus as the voltage across conductors 34 and 36 decreases from a predetermined value which is to be maintained, the energization of the control field windings 122 and 124 becomes unbalanced and the effect of control field winding 122 predominates to create an action which aids the series field winding 116 of the regulating exciter 104 to effect an increase in the energization of the field winding 98 of the main exciter 92. Since the armature windings and series field windings of the regulating exciters 104, 106 and 108 are connected in series circuit relation, then the output of the regulating exciters 106 and 108 is simultaneously increased with an increase in the output of the regulating exciter 104 with the result that the energization of control field windings 100 and 102 of the main exciters 94 and 96, respectively, is increased simultaneously with the increase in energization of the field winding 98 of the main exciter 92. Thus the excitation of generators 10, 12 and 14 is simultaneously increased to effect an increase in the output therefrom and maintain the generators in step, with the result that the voltage across conductors 34 and 36 increases to the value which is to be maintained.

Likewise, if the change in voltage across conductors 34 and 36 is an increase over the value which is to be maintained, the control field windings 122 and 124 of the regulating exciter 104 function to create an action which opposes the action of the different series field windings of the regulating exciters 104, 106 and 108 to simultaneously decrease the energization of the field windings 98, 100 and 102 of the main exciters 92, 94 and 96, respectively. As the excitation of the main exciters 92, 94 and 96 is thus simultaneously decreased, the energization of the field windings 22, 24 and 26 of generators 10, 12 and 14, respectively, is simultaneously reduced to effect an equal decrease in the output from each of the generators, with the result that the voltage across conductors 34 and 36 is reduced to the value which is to be maintained.

The regulating system described hereinbefore is effective for regulating two or more generators connected in parallel, making it possible to effect such regulation without greatly increasing the size of the equipment necessary for maintaining such regulation and without introducing any complicated transfer switching arrangement as in the past. The components utilized are of standard construction and can be readily duplicated. The system is very efficient in operation.

I claim as my invention:

1. In a regulating system for a pair of generators disposed to supply a load, the combination comprising, an excitation control means for each generator disposed to be operated to control the excitation of the associated generator, means responsive to an electrical characteristic of each generator disposed to control the operation of the associated excitation control means, and means disposed for operation to connect the generators in parallel circuit relation to supply the load while effecting the deenergization of one of said means responsive to an electrical characteristic of one of the pair of generators and and connecting the excitation control means in series circuit relation whereby the series connected control means are operated in response to the energization of the other of said means responsive to the electrical characteristic of the other of said pair of parallel connected generators.

2. In a regulating system for a pair of generators disposed to supply a load, the combination comprising, an excitation control means for each generator disposed to be operated to control the excitation of the associated generator, a pair of opposed windings for each of the excitation control means, one of each pair of the opposed windings being disposed to be energized from a constant source of energy, the other of each pair of the opposed windings being disposed to be energized in response to an electrical characteristic of an associated generator, and means disposed for operation to connect the generators in parallel circuit relation to supply the load while effecting the deenergization of one of the pair of opposed windings and connecting the excitation control means in series circuit relation to control the operation of the series connected control means in response to the energization of the other pair of opposed windings.

3. In regulating system for a pair of generators disposed to supply a load, the combination comprising, a regulating generator for each generator disposed to be operated to control the excitation of the associated generator, each regulating generator comprising an armature winding and a pair of opposed field windings, one of the field windings of each pair being disposed to be energized from a constant source of energy, the other of each pair of field windings being disposed to be energized in response to an electrical characteristic of an associated generator, and means disposed for operation to connect the generators in parallel circuit relation to supply the load while effecting the deenergization of one of the pair of opposed field windings and connecting the armature windings of the regulating generators in series circuit relation to control the operation of the generators in response to the energization of the other pair of opposed field windings.

4. In a regulating system for a pair of generators disposed to supply a load, the combination comprising, a regulating generator for each generator disposed to be operated to control the excitation of the associated generator, each regulating generator comprising an armature winding, a series field winding and a pair of opposed field windings, one of the field windings of each pair of opposed windings being disposed to be energized from a constant source of energy, the other winding of each pair of opposed field windings being disposed to be energized in response to an electrical characteristic of an associated generator, switching means disposed for operation to connect the generators in parallel circuit relation to supply the load while effecting the deenergization of one pair of the opposed field windings and connecting the armature windings of the regulating generators in series circuit relation to control the operation of the generators in response to the energization of the other pair of opposed field windings, and means disposed for operation to adjust the series field resistance of the series connected regulating generators.

5. In a regulating system for a pair of generators disposed to supply a load, the combination comprising, an exciter for each of the generators to control the excitation thereof, a regulating generator for each exciter, each regulating generator comprising an armature winding, a main self-excited field winding and a pair of opposed field windings, one winding of each pair of opposed field windings being disposed to be energized from a constant source of energy, the other winding of each pair of opposed field windings being disposed to be energized in response to an electrical characteristic of an associated generator, a contactor disposed to be operated to connect the generators in parallel circuit relation to supply the load while effecting the deenergization of one pair of the opposed field windings and connecting the armature windings of the regulating generators in series circuit relation to control the operation of the generators in response to the energization of the other pair of opposed field windings, adjustable resistors connected in circuit relation with the self-excited windings of the regulating generators, and means disposed for operation to change the connections of the resistors whereby the resistance of the self-excited field winding circuits of the series connected regulating generators can be adjusted to tune the regulating generators to maintain the resistance of the self-excited field winding circuits at a value such that the field resistance line of the regulating generator having said other pair of opposed field windings coincides with a straight line portion of the saturation curve thereof.

ERLING FRISCH.